A. R. SELDEN.
RUNNING GEAR FOR VEHICLES.
APPLICATION FILED FEB. 10, 1908.

1,008,373.

Patented Nov. 14, 1911.

2 SHEETS—SHEET 1.

WITNESSES:
C. W. Carroll
L. Thom.

INVENTOR:
Arthur R. Selden

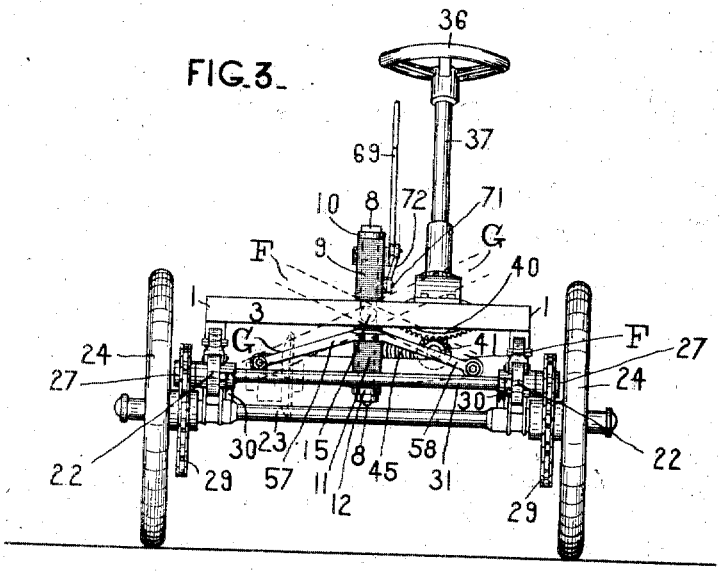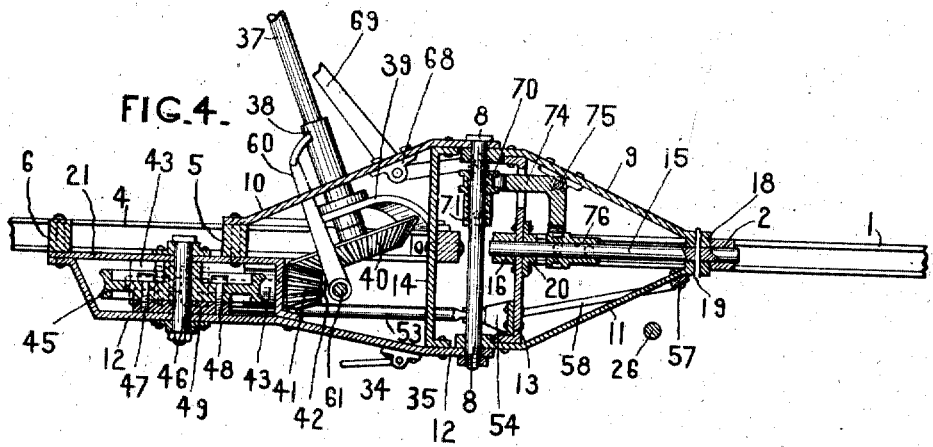

UNITED STATES PATENT OFFICE.

ARTHUR R. SELDEN, OF ROCHESTER, NEW YORK, ASSIGNOR OF ONE-FIFTH TO WILLIAM D. ELLWANGER, OF ROCHESTER, NEW YORK.

RUNNING-GEAR FOR VEHICLES.

1,008,373.     Specification of Letters Patent.     Patented Nov. 14, 1911.

Application filed February 10, 1908. Serial No. 415,156.

*To all whom it may concern:*

Be it known that I, ARTHUR R. SELDEN, a citizen of the United States, and resident of Rochester, in the county of Monroe and State of New York, have invented certain new and useful Improvements in Running-Gears for Vehicles, of which the following is a specification.

This invention relates to improvements in running gears, applicable particularly to self-propelled road vehicles or automobiles, of the type in which the frame of the vehicle is divided into two parts which are connected by pivotal joints, affording provision for relative angular movements of the parts about both horizontal and vertical axes.

One object of the invention is to produce a running-gear, of the kind above referred to, which shall readily yield to inequalities in the road-surface, while being strong and rigid in its several elements.

Another object of the invention is to produce simple and effective mechanisms, for use in connection with a running-gear of the type in question, by which the necessary movements are transmitted from one part of the running-gear to another, both for steering the vehicle and for controlling the motive power.

To the foregoing ends the invention consists in the running-gear hereinafter described, as it is defined in the succeeding claims.

Figure 1:
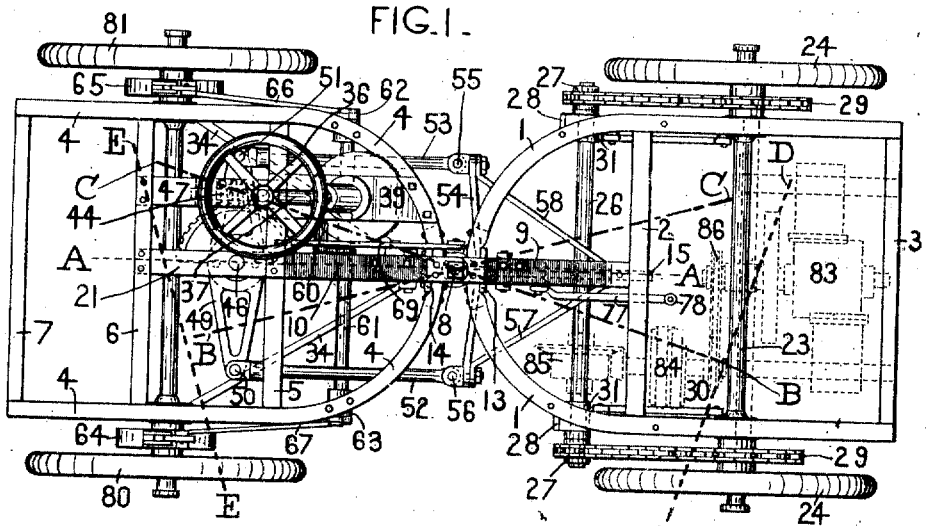
Figure 2:
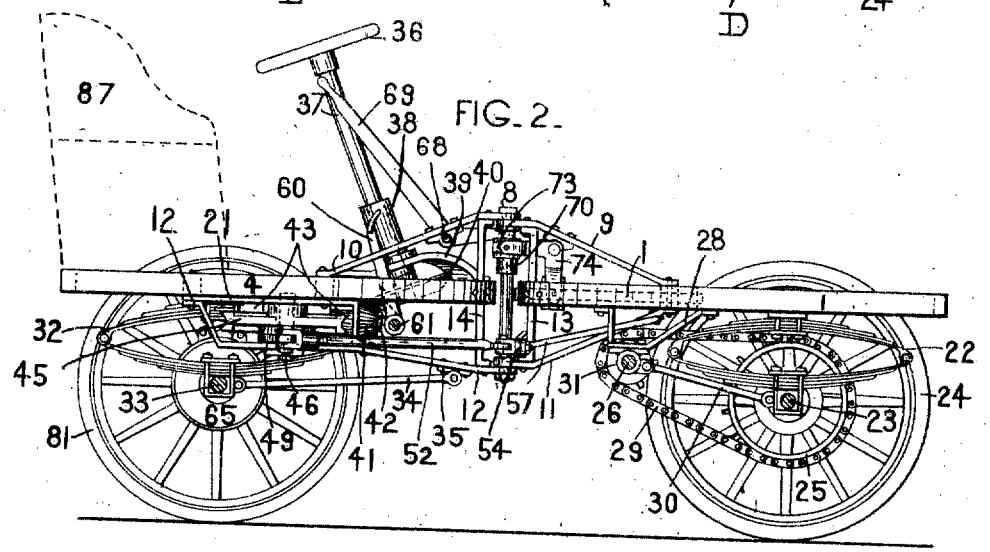

In the drawings:—Figure 1 is a plan view of a running gear embodying the present invention; Fig. 2 is a side elevation of the running gear; Fig. 3 is a front elevation of the running gear; and Fig. 4 is an enlarged longitudinal median section on the line A—A in Fig. 1.

The illustrated embodiment of the invention is a running gear adapted for use in an automobile of the runabout type. It comprises two frames, which are designated respectively by the reference numbers 1 and 4, and are similar in general form. Each frame is horizontal and of substantially the full width of the vehicle, that is the full width allowed by the "gage" of the wheels, and each frame comprises longitudinal side members and transverse members connecting the side members. Since the frames substantially meet at the middle of the vehicle where the steering pivot is located it is necessary that they be so formed as to permit them to swing into angular positions, and to this end the adjacent ends of the frames are inclined at either side of the pivot, being formed, specifically, as semi-circles at this point, though the curved form is adapted rather for grace in design than for any practical superiority in this connection.

The vertical pivot about which the frames turn is constituted by a rod or pivot 8. This pivot is fixed in the forward part of the rear frame 4, the rear frame at this point having a substantially triangular vertical portion comprising upwardly and downwardly-inclined braces 10 and 12, respectively. These braces are spaced apart near their forward extremities by a vertical strut 14, and their rear ends are fixed to crossbars 5 and 6 extending between the side members of the rear frame 4. The pivot 8 is provided with a head at one end and a nut at the other by which it is secured in holes in the forward extremities of the braces 10 and 12, as shown particularly in Fig. 4.

The forward frame 1 is not pivoted directly upon the vertical pivot, but an intermediate connecting member is interposed in order to permit the frames to have relative movement about a horizontal axis for the purpose hereinbefore described. The connecting member is in the form of a vertical frame of generally-triangular form, comprising inclined upper and lower members 9 and 11, respectively. These members terminate at their forward ends in a head 18, while their rear ends are pivoted upon the vertical pivot 8 and are spaced apart by a vertical strut 13.

The connecting member is connected with the forward frame 1 by a horizontal pivot in the form of a rod 15 which is fixed in the head 18 and in a boss 20 on the vertical strut 13. Upon the rear end of the rod 15 is pivoted the rear curved portion of the frame 1, which is provided with a central boss 16 for this purpose, and a horizontal cross-piece 2 extending from side to side of the frame 1 is pivoted upon the forward end of the rod 15.

The construction just described is such that the two frames 1 and 4 are held at all times with their longitudinal axes rigidly in the same horizontal plane, while at the same time the frames are free to be moved relatively about either the vertical pivot 8 or the horizontal pivot 15 for the purposes described.

The forward frame 1 is mounted upon ordinary springs 22 which are fixed to the forward axle 23. The front wheels 24 are utilized as driving wheels, and to this end are provided with sprockets 25. The sprockets 25 are connected, by sprocket chains 29, with sprockets 31 on the ends of a countershaft 26 which is journaled in hangers 28 on the frame 1. The countershaft 26 may be connected with any suitable power mechanism. In Fig. 1 I have shown in dotted lines a mechanism comprising a differential gear 85, change-speed mechanism 84, a motor 83, and a driving connection 86 between the motor and the change-speed mechanism. All of this driving mechanism is mounted upon the forward frame 1, and is preferably so arranged thereon as to distribute its weight evenly with respect to the front axle and thus to avoid any unnecessary vertical strain upon the connections between the frames 1 and 4.

The rear frame 4 is mounted upon springs 32 fixed to the rear axle 33. The rear wheels 80 and 81 are provided with brakes 64 and 65 which are connected, by means of rods 66 and 67, with arms 62 and 63 on a rockshaft 61 journaled on the frame 4. A treadle 60 is fixed to the rock-shaft 61 and extends upward in convenient position to be operated.

The usual distance rods 30 and 34 are used to connect the front and rear axles, respectively, with the frames.

The steering mechanism is mounted in stationary position upon the rear frame 4, and has flexible connections with the intermediate connecting frame in order to swing the latter, together with the forward frame 1, about the vertical pivot. A manually-operated steering wheel 36 is mounted on a steering column 37 which is journaled in a sleeve 38 carried by a bracket 39 on the rear frame 4. At the lower end of the steering column is a bevel gear 40 which meshes with a pinion 41. The pinion 41 is mounted on the forward end of a horizontal shaft 42 journaled in lugs 43 on the frame 4, and the shaft 42 is provided with a worm 44 which engages a horizontal worm-wheel 45. The worm-wheel is journaled on a vertical stud 46 which is fixed in the brace 12 at its lower end and in a horizontal brace 21 at its upper end. To the bottom of the worm-wheel a transverse lever 49 is fixed by means of screws 47 and 48. The lever 49 is connected with the intermediate connecting frame in such a manner as to swing the latter when the lever is swung in either direction by the rotation of the worm-wheel. To this end the connecting frame is provided with a cross-piece 54, which is braced by inclined rods 57 and 58 and constitutes arms projecting on either side of the vertical steering pivot. The ends of the lever 49 are connected with the ends of these arms, respectively, by two links 52 and 53 which are connected with the lever 49 by pivotal joints 50 and 51, and with the cross-arms 54 by pivotal joints 55 and 56.

The construction above described is such that when the steering wheel 36 is turned the steering lever 49 is swung in one direction or the other by means of the worm and gear mechanism, and the links 52 and 53 communicate this motion to the connecting member and the forward frame 1, so that the frames 1 and 4 are swung relatively about the steering pivot. The connections are such, further, that they do not interfere with the relative movements of the frames about the horizontal pivot since the links and the pivotal joints at their ends readily accommodate themselves to such movements. The action of the worm mechanism is to render the steering mechanism irreversible, so that is to say, it locks the frames in all angular positions so that shocks against the vehicle wheels, due to inequalities in the road surface, cannot rotate the steering wheel and change the angular relation between the frames.

It should be noted that, owing to the location of the steering pivot in substantially the center of the vehicle, the wheels assume such angular positions in steering that they always track, that is to say, the rear wheels always follow the front wheels in rounding a curve, the same as when the vehicle is going directly forward. The relative positions of the frames and the axles, when the vehicle is being steered to the right, are illustrated by broken lines in Fig. 1, the line B—B representing the positions of the longitudinal axes of the frame, the line D—D showing the position of the front axle, and the line E—E the position of the rear axle. When the vehicle is steered to the left, the axes of the frames assume the position illustrated by the line C—C.

Where the steering mechanism is mounted in the rear frame, as above described, the arrangement is particularly adapted for use in a vehicle of the runabout type, that is a vehicle having a single seat mounted on the rear frame, as shown in dotted lines at 87 in Fig. 2. In this case, since the vehicle is controlled from the rear frame, it is necessary to provide flexible connections between the manually-operable controlling devices and the power mechanism on the forward frame in order to control the motor and the change speed gearing where such is used. For this purpose I have devised a mechanism comprising members sliding longitudinally upon the vertical and horizontal pivots, so that their movement is unaffected by rotative movements on these pivots. A hand lever 69 is pivoted at 68 on the rear frame. This lever has a forwardly-projecting arm pivoted at its forward end to a depending link 72 (Fig. 3). The lower end of the link 72 is pivoted at 71 to the side of a sleeve 70 which slides vertically on the pivot 8. The sleeve is grooved at its upper end, and this grooved portion is engaged by studs 73 on the forked end of a bell-crank lever 74 which is pivoted at 75 on the intermediate connecting member. The bell-crank lever has a depending arm which is similarly articulated with a sleeve 76 sliding on the horizontal pivot 15. By means of a link 77 (Fig. 1) the sleeve 76 may be connected with any part of the driving mechanism which requires to be actuated by the hand lever 69. Owing to the form of connection between the bell-crank lever and the two sleeves, this connection is independent of rotative movements by either of the pivots, and communication between the hand lever and the driving mechanism is thus unaffected by such movements.

I claim:

1. A running gear having, in combination, two vertical, substantially triangular frame members connected by a vertical pivot, two substantially horizontal frames connected with the vertical frames respectively, one of the horizontal frames being connected with the corresponding vertical frame by a longitudinal horizontal pivot, means for turning the frames relatively about the vertical pivot, and a pair of wheels supporting each horizontal frame.

2. A running gear having, in combination, two frames, connections between the frames including a vertical pivot and a horizontal pivot, driving mechanism mounted on one frame, a manually-operable controlling device mounted on the other frame, and connections between the driving mechanism and said device comprising sleeves on the two pivots and a lever connecting the sleeves.

3. A running gear having, in combination, two frames, a substantially vertical pivotal connection between the frames, arms connected with one of the frames and projecting on either side of the pivotal connection, manually-operable steering mechanism mounted upon the other frame, and two links connecting said arms, respectively, with the steering mechanism.

4. A running gear having, in combination, two substantially horizontal frames, an intermediate connecting member of substantially triangular form having two corners arranged in substantially vertical relation and pivotally connected with one of said frames, pivotal connections between the other frame and the connecting member at points located substantially at the third corner and a vertical edge of the connecting member, a front axle and a rear axle, and springs interposed between the axles and the frames, respectively.

5. A running-gear having, in combination, two frames, connections between the frames comprising a vertical pivot and a horizontal pivot, power-mechanism on one frame, a controlling lever for said power-mechanism mounted on the other frame, and connections between said power-mechanism and said lever comprising sleeves on the two pivots, a rock-lever connecting the two sleeves, connections between the controlling lever and one sleeve, and connections between the power-mechanism and the other sleeve.

ARTHUR R. SELDEN.

Witnesses:
D. GURNEE,
C. S. DAVIS.